April 25, 1944.   A. F. POTT   2,347,610
CALCULATING MACHINE, CASH REGISTER, OR THE LIKE
Filed Dec. 29, 1937   8 Sheets-Sheet 1

A. F. Pott
INVENTOR

By: Glascock Downing & Seebold
ATTYS.

Fig. 2

April 25, 1944.  A. F. POTT  2,347,610
CALCULATING MACHINE, CASH REGISTER, OR THE LIKE
Filed Dec. 29, 1937  8 Sheets-Sheet 5

A. F. Pott
Inventor

April 25, 1944.   A. F. POTT   2,347,610
CALCULATING MACHINE, CASH REGISTER, OR THE LIKE
Filed Dec. 29, 1937   8 Sheets-Sheet 6

A. F. Pott
Inventor

Fig.17.

Patented Apr. 25, 1944

2,347,610

UNITED STATES PATENT OFFICE 2,347,610

CALCULATING MACHINE, CASH REGISTER, OR THE LIKE

August Friedrich Pott, Zella-Mehlis, Thuringia, Germany; vested in the Alien Property Custodian Application December 29, 1937, Serial No. 182,336
In Germany August 18, 1934

2 Claims. (Cl. 235—144)

This application is a continuation in part of my applications Ser. 35,546 and 83,751 and relates to calculating machines, cash registers or the like having totalizers moved by the paper carriage for the simultaneous calculation of all the denominations of a multi-denominational value.

In these machines, as is known, totalizers of different width are used and are disposed as required on the carriage. The actuating mechanism, therefore must have a number of actuator segments and type-printing rods corresponding to the widest totalizer.

When a narrow totalizer is located over the actuating mechanism, no difficulties are encountered in holding the actuator segments lying to the left adjacent the totalizer in their rest position since they were not set from the keyboard for any movement.

On the contrary difficulties are encountered in total-taking, since in this case only those actuators need be operated which stand opposite to the operative totalizer and within the width of this totalizer only those actuator segments which stand opposite to the denominations containing a value.

These difficulties were attempted to be overcome in calculating machines in which the drive of the type-printing members in the setting direction was effected by spring power, by incorporating in the machine a locking mechanism which was released in dependence upon the totalizer in the working position by a control member arranged on this totalizer so that only the denominations of the actuator mechanism were released which correspond to the number of the denominations of the totalizer in the working position. In these totalizers, however, no means were provided for automatically preventing errors in total-taking due to the totalizers being incorrectly set through inattention or mistake on the part of the operator. These devices, moreover, were unsuitable for overcoming the difficulties in machines in which both the forward and backward movements of the totalizer actuating members and of the type-printing rods were effected positively.

According to the invention these difficulties are overcome in this type of machine also, by providing for each totalizer a zeroizing device operated preferably by a power drive and by taking totals by this zeroizing device. By this construction the provision of a locking mechanism is dispensed with so that the building of the machine is simplified. Also, with this arrangement security is provided against incorrect settings.

In the drawings, one example of construction of the invention is represented.

Figure 3:
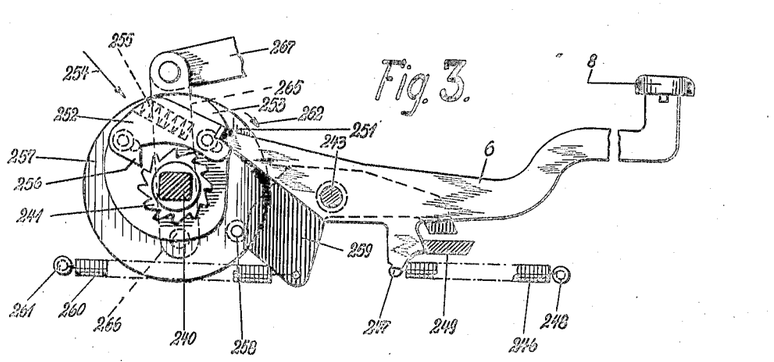
Figure 3 shows a side elevation of the coupling mechanism for the total taking mechanism.
Figure 11:
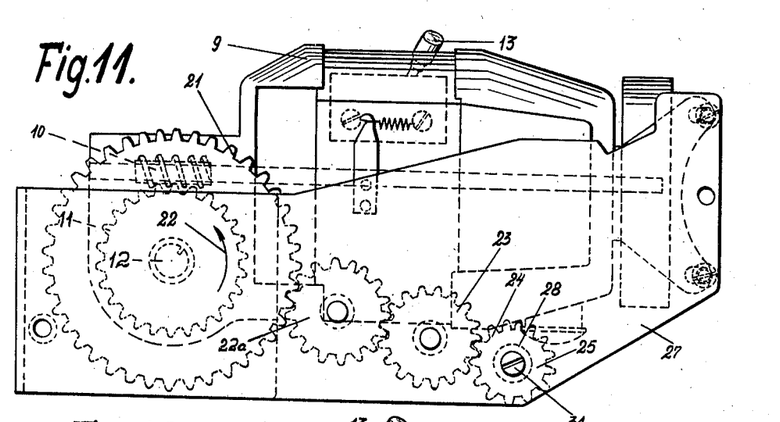
Fig. 11 is a view in side elevation of the coupling mechanism located on the right hand side of its supporting plate.

On the right hand side of the machine the addition key lever 4, the multiplication key lever 5 and the total key lever 6 are arranged. The forwardly directed end of the addition key lever 4 is bent upwards (Figs. 1 and 12) and the free upwardly directed end again bent off at right angles to the left is provided with the marking "Add." The forwardly and upwardly directed free end of the key lever 5 is bent off at right angles to the right and provided with the marking "Mult." The free forwardly directed end of the key lever 6 is provided with a key 8, which is marked with "T" (Fig. 3). Further a motor 9 (Fig. 11) is removably attached on the right hand side of the machine. The rotations of the motor 9 are transferred through a worm 10 (Fig. 11) and a worm wheel 11 to a driving shaft 12. The motor 9 is switched in by means of a handle 13, which is likewise arranged on the right hand side of the machine. On the rear side of the machine the paper carriage 14 (Fig. 1) is arranged. On the paper carriage 14 as many totalizers 16 as desired of different widths are arranged on a totalizer attaching rail 15.

Upon throwing the main switch handle to its "On" position, the motor 9 commences to rotate. The main drive shaft 12 and the toothed wheel 21 mounted on the shaft are rotated in the arrow direction 22 (Fig. 11) by way of the worm 10 and the worm wheel 11.

*Operation of the drive for the adding and printing mechanism*

Figure 4:
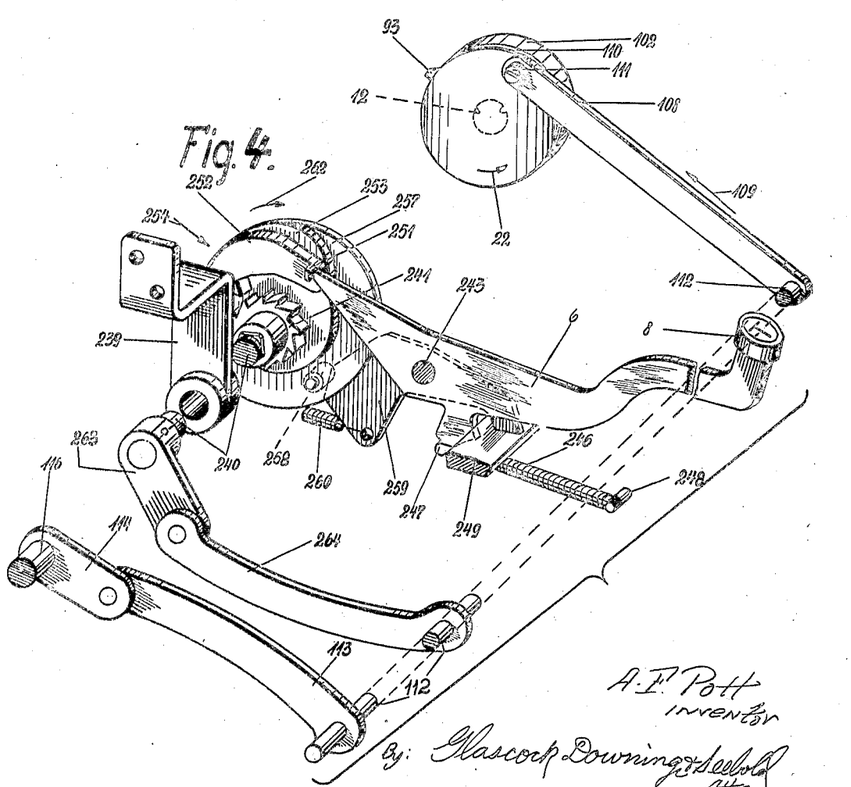
Figure 4 shows a perspective elevation, viewed from the left hand front of the machine, of the arrangement of the couplings, in which view different parts for the sake of clearness are represented drawn out from one another.
Figures 12, 13, 14, 15:
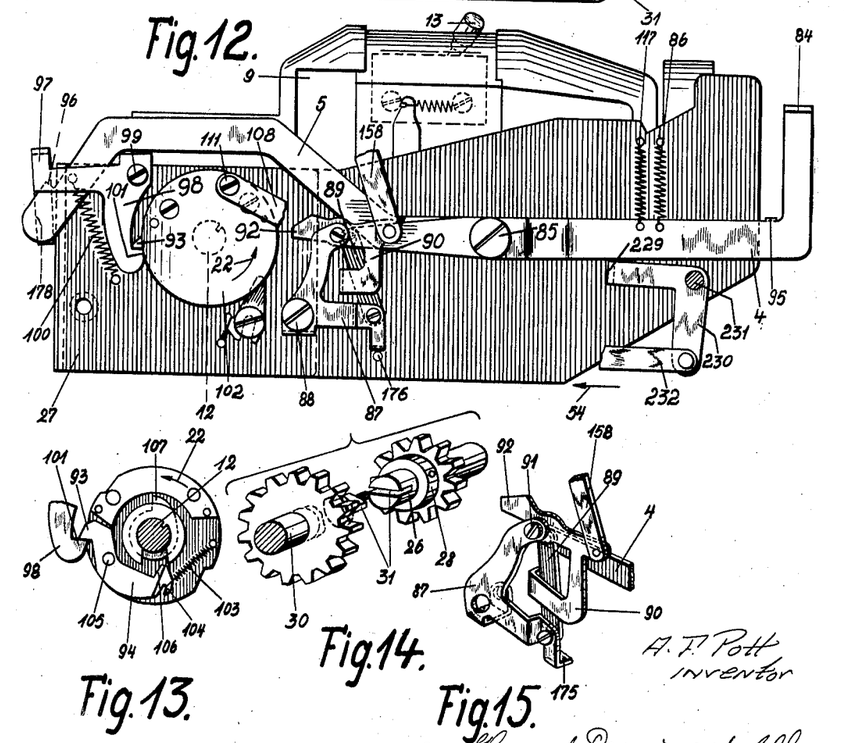
Fig. 12 is a similar view showing the parts of the coupling mechanism located on the left hand or inner side of the supporting plate.
Fig. 13 is a detail sectional view through the coupling mechanism, with the parts in their normal positions.
Fig. 14 is a detail perspective view showing certain gear parts in disassembled position.
Fig. 15 is another detail perspective view of a part of the coupling control.

If it is desired to add and print the set up value the key 84 (Figs. 12 and 2) is depressed, whereby the key lever 4 is rocked round the screw 85 in the clockwise direction against the action of the spring 86 which engages with it. Hereby, the angle-lever 87 (Figs. 12 and 15) is rocked in the anti-clockwise direction round the screw 88 through the intermediary of the connecting rod 89 which connects the lever 4 with one end of the angle lever 87. Consequently the nose 92 of the pawl 90 pivotally arranged on the coupling lever 87 by means of a screw 91, enters the path of movement of the nose 93 of the coupling pawl 94 (Figs. 4, 12 and 13). Furthermore, on depression of the key 84 the lug 95 (Figs. 17 and 12) bent off from the key lever 4 acts on the key lever 5 and rocks the same likewise in the clockwise direction round the screw 85. In this movement the projection 96 of the rearwardly directed part of the key lever 5 acts upwards against the bridge 97 (Fig. 12) of the U-shaped part of the coupling lever 98, whereby the latter is rocked round the screw 99 in the clockwise direction against the action of the spring 10. Hereby the nose 101 of the coupling lever 98 releases the nose 93 (Figs. 12 and 13) of the coupling pawl 94 located in the coupling casing 102. The coupling pawl 94 under the action of the spring 103 engaging with its nose 104 (Fig. 13) can now swing round the pin 105 in the anti-clockwise direction, whereby the nose 106 of the coupling pawl 94 comes into the path of movement of the cam 107 rigidly mounted on the main drive shaft 12. Since, as already described, the shaft 12 and the cam 107 are already in rotation, owing to the switching in of the motor 9, the nose of the cam 107 acts on the nose 106 of the coupling pawl 94 which has been brought into engagement with it. Since this pawl, in consequence of the action of the spring 103 is held in engagement with the cam 107, the latter takes along with it the pawl 94 and consequently also the coupling casing 102 in the arrow direction 22.

Figures 1, 18:
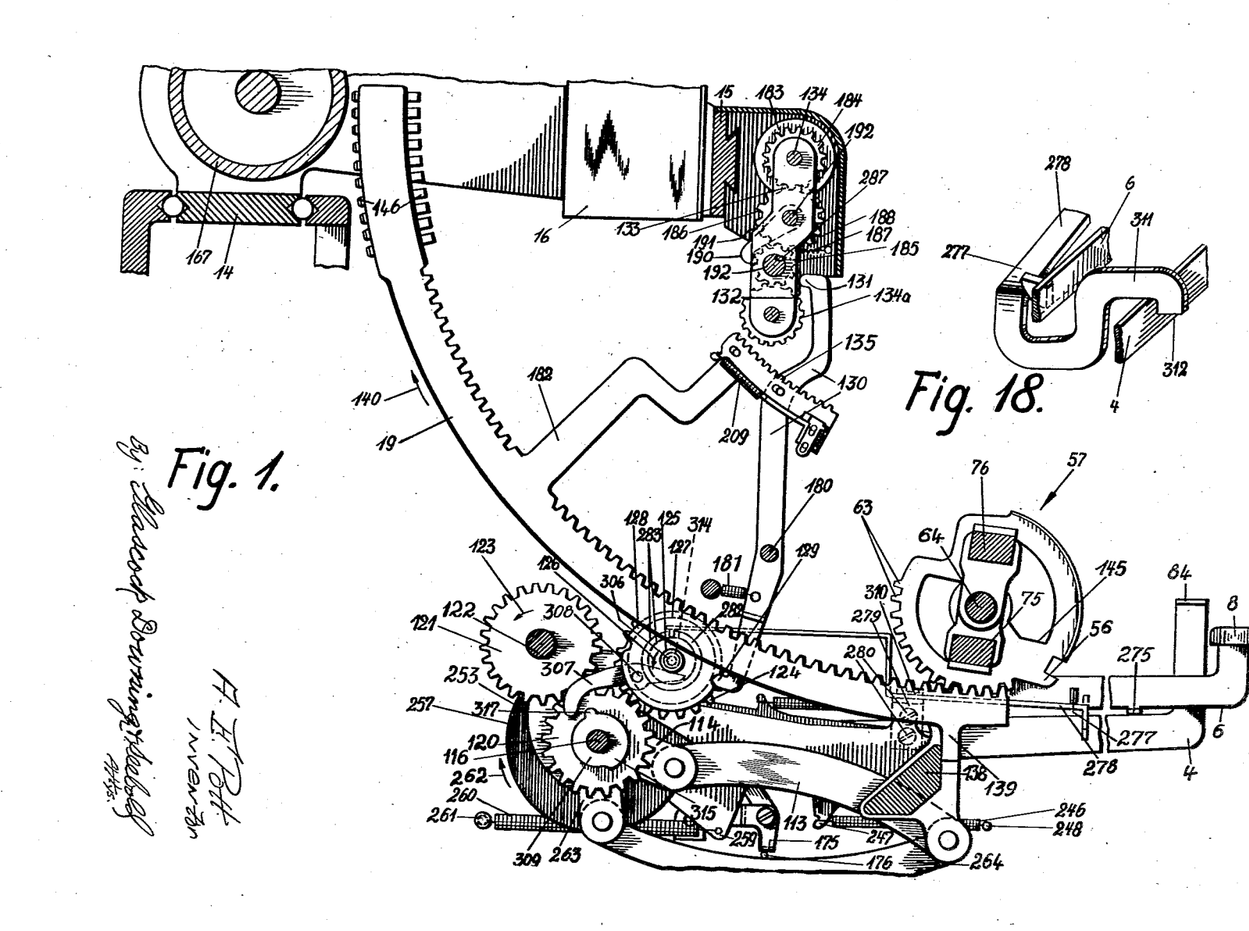
Figure 1 is a sectional view in side elevation of the coupling mechanism for the register in its rest position. The right hand side wall of the machine is removed for the sake of clearness.
Fig. 18 is a fragmentary perspective view of a detail of the total key lever.
Figure 2:
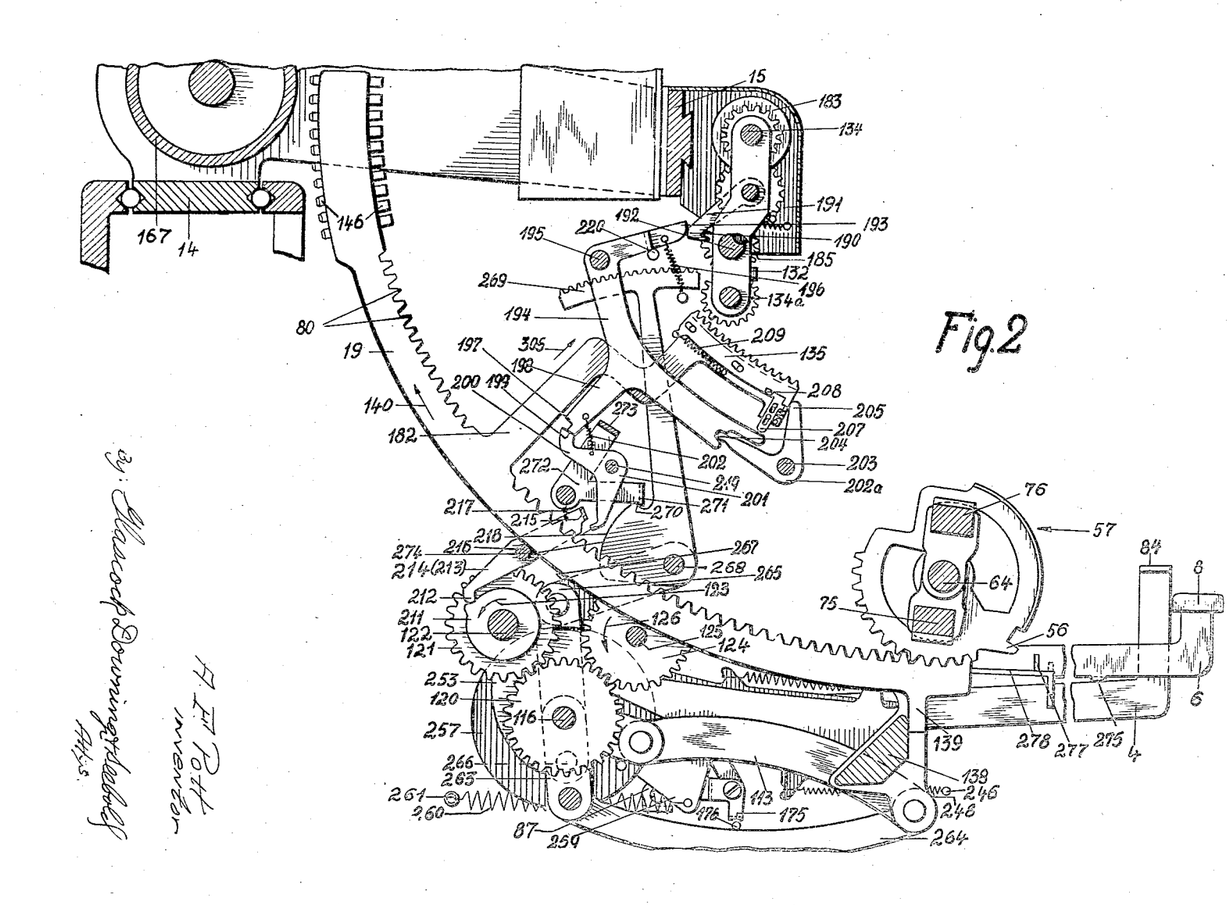
Figure 2 shows a side elevation according to Fig. 1, in which view the arrangement of the resetting device is illustrated.
Figure 16:
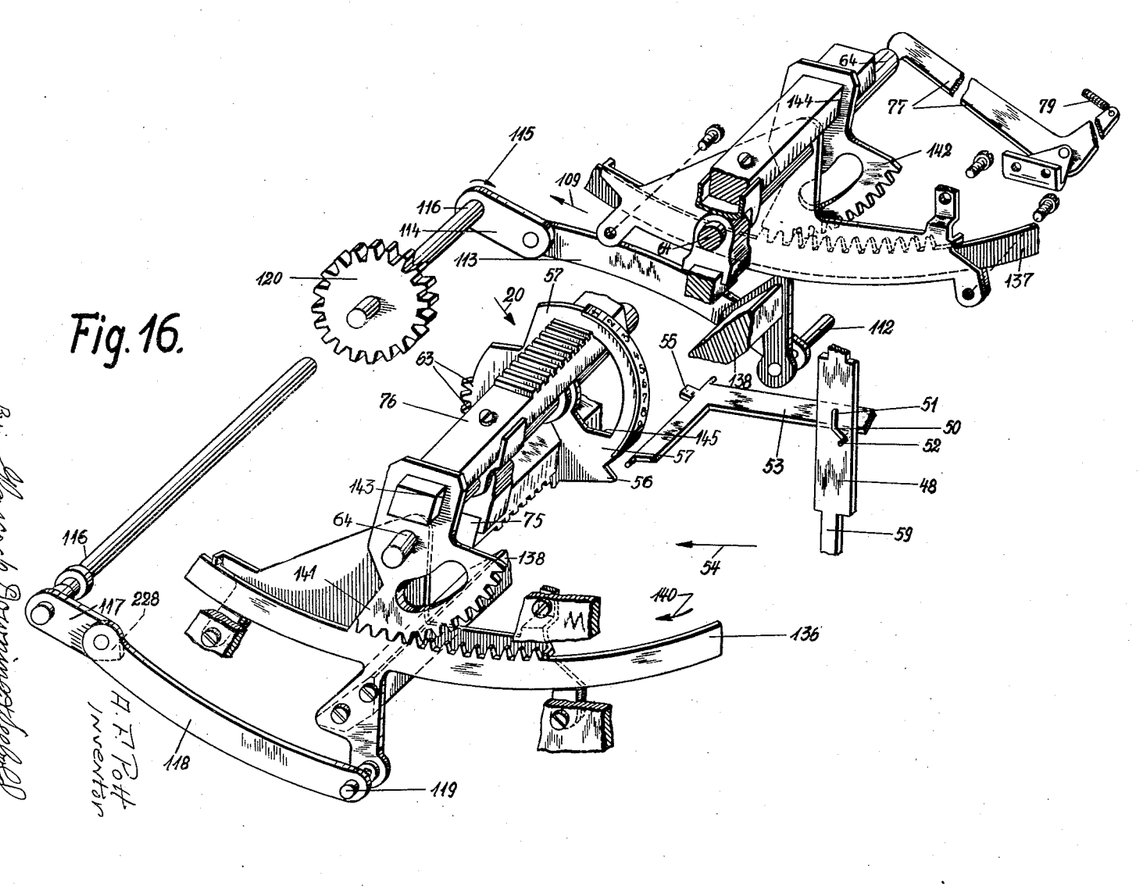
Fig. 16 is a disassembled perspective view from the left front of the machine, showing the adjusting and indicating wheels and the restoring mechanism therefor.

In the rotation of the coupling 102 in the arrow direction 22 the rod 108 (Fig. 4) is moved in the arrow direction 109, owing to its connection to the cover 110 of the coupling housing 102 by means of the headed screw 111. By the movement of the rod 108 in the arrow direction 109 the stub shaft 112, fixed to the rod 108 is equally moved in the direction of the arrow 109. As a result, the link 113 (Figs. 4 and 16) is moved in the arrow direction 109, rotating thereby the arm 114 in the direction of the arrow 115. The arm 114 is rigidly mounted on a shaft 116, rotatably mounted in the machine frame 33. On the other end of the shaft 116, a second arm 117 is rigidly mounted to which a link 118 is pivoted which latter carries a stub shaft 119 arranged in axial alignment with the stub shaft 112. In the rotation of the shaft 116 participates also the toothed wheel 120 (Figs. 1, 2 and 16).

Simultaneously with said movement of the parts 102, 108, 112, the parts 264, 263 are moved in the same direction, whereby the shaft 240 (Fig. 4) is rotated likewise in the arrow direction 115. However no further mechanisms are operated thereby.

Since the toothed wheel 120 is in engagement with the toothed wheel 121 (Fig. 2) mounted on the shaft 122, the toothed wheel 121 is rotated in the arrow direction 123. The toothed wheel 124 mounted on the shaft 125 and standing in engagement with the toothed wheel 120 is hereby rotated in the arrow direction 126.

The cams 127 and 128 (Figs. 1, 5 and 17) rigidly mounted on the shaft 125 also participate in the rotation of the shaft 125 in the arrow direction 126. The cam 127 may be called the total cam because it controls the totalizer in total taking, whereas the cam 128 may be called the adding cam because it controls the totalizer in addition. Normally the cam 128 is in contact with the nose 129 of the lever 130 and as the nose 129 of the lever 130 in the rotation of the cam 128 in the arrow direction 126 slides on the lower part of the cam 128 (Fig. 1) the latter has no action during the first half of its revolution on the lever 130.

Consequently, the nose 131 may not act on the lug 132 of the totalizer frame 133, swingable round the shaft 134 (Fig. 1).

Referring now again to the stub shafts 119 and 112 in Fig. 16, it may be noted that each of them is pivotally connected to toothed sectors 136 and 137. The stub shafts 119 and 112 are guided in slots (not shown) in the side walls of the machine frame, which slots are concentrically arranged with the toothed sectors 136 and 137. The toothed sectors 136 and 137 are connected by a bar 138, cooperating with noses 139 (Figs. 1 and 2) on the actuators 19.

When the toothed sectors 136 (Fig. 16) and 137 are acted upon in the arrow direction 140 by way of the levers 113 and 118 in the above mentioned rotation of the levers 114 and 117 in the arrow direction 115, the bar 138 also travels in the arrow direction 54, whereby the noses 139 (Figs. 1 and 2) of the actuators 19 are released for movement. In this operation the toothed segments 141 and 142 (Fig. 16) which are in engagement with the toothed sectors 136 and 137 are swung round the shaft 64 in the clockwise direction in which swinging movement the beam 76 projecting into the recesses 143 and 144 of the toothed segments 141 and 142 also participates. In the swinging movement of the beam 76 in the clockwise direction round the shaft 64, this beam 76 acts successively on the edges 145 of the adjusting and indicating wheels 57 and swings the same in succession according as the adjusting and indicating wheels 57 were swung more or less in the anti-clockwise direction round the shaft 64 in the setting operation correspondingly to the set value.

As soon as the adjusting and indicating wheels 57 are swung in the clockwise direction in consequence of the action of the beam 76, the actuator segments 19 standing in engagement with the adjusting and indicating wheels 57, so far as in the denomination concerned a value was set, are also acted upon in the arrow direction 140 (Figs. 1 and 2).

*Coupling and driving mechanism for total taking*

In a bracket 239 (Fig. 4) fixed in any suitable manner to the machine frame 33, a stub shaft 240 is rotatably mounted, which shaft is arranged in axial alignment with the shafts 12 and 116. On the stub shaft 240, a ratchet wheel 241 is rigidly mounted. The key lever 6 is pivoted at 243 (Figs. 3 and 4) of a U-shaped part 244 (Fig. 17), mounted on the right hand side wall of the machine frame 33, the lever being normally maintained in its position by the spring 246 (Fig. 4) engaging the hook 247 of the lever 6 and the stationary bolt 248. The abutment or stop 249 contacting with the hook 247 of the lever 6 limits its pivoting action in one direction. The abutment or stop 249 is fixed to the machine frame by means of a bracket (not shown).

When the key 8, which is marked with "T" is depressed, the lever 6 is rocked on its pivot 243 clockwise, whereby the nose 251 of the pawl 252 is released by means of the rearwardly directed arm of the key lever 6. Since the pawl 252 is movable on the cam disc 253, which is rotatably mounted on the shaft 240, the pawl 252 is thus caused to move in the direction indicated by the arrow 254 by the compression spring 255 (Fig. 3). Consequently, the nose 256 of the pawl 252 engages with the continuously rotating ratchet wheel 241. The cam 253 is thus coupled with the ratchet wheel 241.

In order to maintain the cam disc 253 in its normal position shown in Figure 3, the cam 253 is secured to a disc 257 on which is rotatably mounted a roller 258 on the opposite side of the cam 253. The said roller 258 cooperates with the lever 259 which is also mounted on the pivot 243 and is always kept in contact with the roller 258 by a spring 260 secured to the lever 259 and also at 261 on the machine frame. Since the end of the lever 259 does not bear against the stop 249, the cam disc 253 will always be urged in the direction of the arrow 262 by the spring 260 acting through the lever 259, the roller 258 and the disc 257, while the rotation of the cam disc 253 is prevented by the lug 251 of the pawl 252 contacting the end of the lever 6 and consequently the cam disc 253 is maintained in its normal position.

From the foregoing, it results that if the key 8 is depressed and immediately released, the disc 257 will perform one revolution only, which rotary movement is transmitted to the stub shaft 240 through the levers 263, 264 from the stub shaft 112, which in its turn receives its driving movement from the coupling 102.

Prior to the completion of a revolution of the stub shaft 240, the roller 258 of the disc 257 comes in contact with the curved end of the lever 259 and rocks the same on its pivot 243 counterclockwise against the action of the spring 260 engaging therewith until the roller 258 goes beyond the dead centre. From this moment the lever 259 exerts a driving action on the roller 258 and on the cam disc 253, whereby a rotary motion independent of the stub shaft 240 is imparted to the cam disc 253 to simultaneously impart a lead of the cam disc 253 relative to the stub shaft 240 and the ratchet wheel 241 respectively, thereby facilitating the uncoupling of the pawl 252 from the ratchet wheel 241.

*Total taking mechanism*

To the disc 257 described under the chapter "Coupling and driving mechanism for total-taking," is jointed a rod 265 (Figs. 2 and 3) by means of the pin 266 and this rod is in articulated connection with a lever 267 rigidly mounted on a shaft 268 which is rotatably mounted in the two side walls of the machine frame 33. On the shaft 268, further, a toothed segment 269 is rigidly mounted which is adapted to co-act with parts to be later described in detail.

On the toothed segment 269 is formed a nose 270 which is adapted to co-act with a nose 271 bent off at right angles on one arm of a bail 272, 273. The bridge 273 of the bail 272, 273, is adapted to co-act with the three-armed levers 194. When the segment 269 is rocked clockwise, the nose 270 rocks the bail 272, 273 anti-clockwise and maintains the same in its rocked position by means of the concentric part 274 of the segment 269, in which position the tens transfer levers 194 are locked for total taking.

On the total key lever 6 is formed a lug 275 (Figs. 17 and 2) which engages over the key lever 4 and is adapted to co-act with this key lever in a manner to be hereinafter described.

Figure 17:
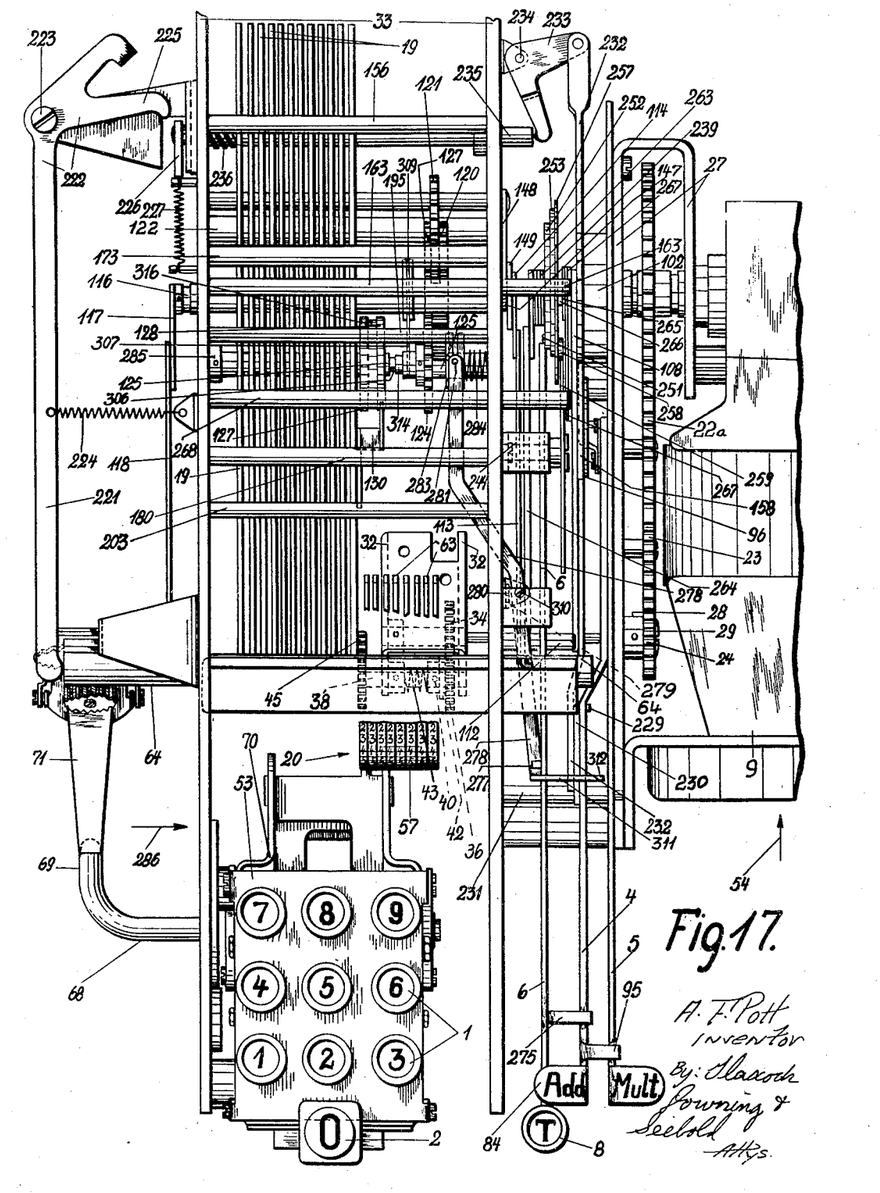
Fig. 17 is a plan view of the machine, in which the cover plates and the paper carriage are removed for the sake of clearness, and parts omitted to enable the clearer disclosure of others.

On the total key 6 is formed a nose 277 which is adapted to co-act with the forwardly directed arm of a shifter lever 278 pivotally mounted on an angle member 279 (Fig. 17) attached at 280 to the right hand side wall of the machine frame 33. On the rearwardly directed limb of the shifter lever 278 is arranged a pin 281 (Fig. 5) which projects into a ring groove 282 of a ring groove sleeve 283. The ring-groove sleeve 283 is rigidly mounted on the shaft 125. By means of a spring 284 which on the one hand lies against the right hand side wall of the machine frame and on the other hand lies against the ring groove sleeve 283, the sleeve 283 and the shaft 123 are influenced oppositely to the direction of the arrow 286 (Fig. 17). The normal position of the shaft 125 is determined by the striking of a collar 285 (Fig. 17) against the left hand side wall of the machine frame 33. Further, a driving wheel 124 (Figs. 1, 5 and 17) is fixed to the shaft 125 and is in engagement with a toothed wheel 120 arranged on the shaft 116, the wheel 120 being twice as broad as the toothed wheel 124 so that the toothed wheel 124 remains in engagement with the toothed wheel 120 when the shaft is displaced in the arrow direction 286 (Fig. 17) in a manner to be hereinafter described.

Figure 5:
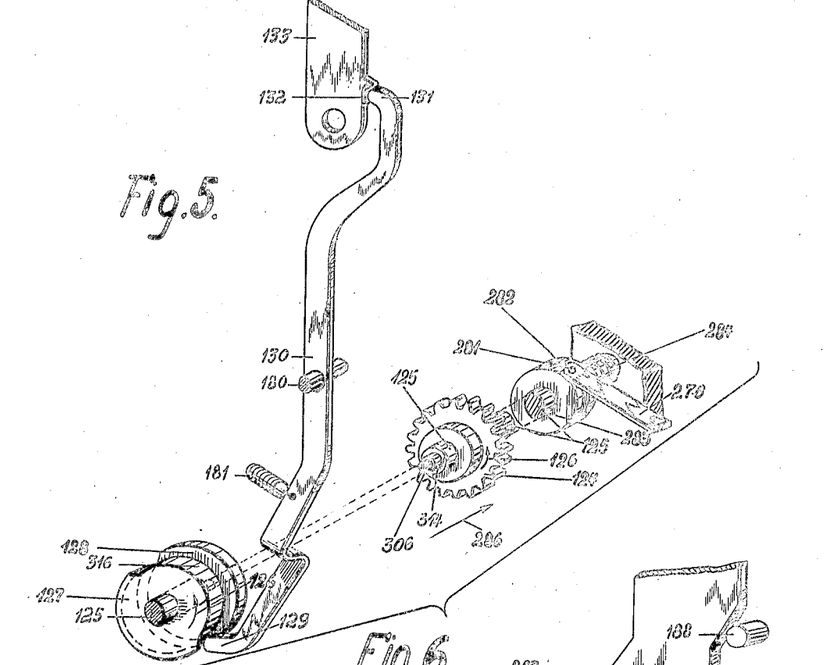
Figure 5 shows in perspective a detail of Fig. 1.

Besides the cam 128 for addition, a second cam 127 for total taking is mounted on the shaft 125 which cam 127 is constructed as shown in Fig. 5 and is adapted to cooperate with the totalizer controlling lever 130.

In the shaft 192 (Figs. 2 and 6) is located a half round groove in which a rotatable or oscillatable key 287 seats, and this key is peripherally curved in the zone of the wheels 185 at 288 corresponding to the arc of the circumference of the shaft 192 so that the arc-shaped face 288 and the remaining circumference of the shaft 192 form a normally continuous cylindrical surface. At its left-hand end the rotatable key is provided with a second short face 289 displaced in relation to the face 288. The face 289 on the displacement by rotation of the rotatable key 287 in the opposite direction to the arrow 290 is likewise adapted to form a cylindrical surface with the remaining surface of the shaft 192. In the normal or home position (Figs. 6 and 8) of the shaft 192, the edge of the face 289 of the rotatable key 287 lies against the locking edge 291 of the hole 292 in the left hand side wall of the totalizer frame 133.

Figures 6, 7:
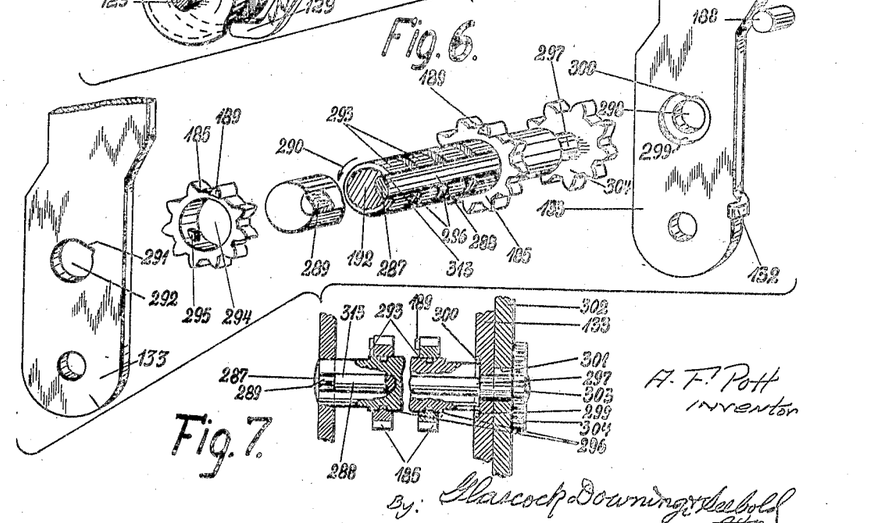
Figure 6 shows a perspective elevation, viewed from the left hand front of the machine, of the arrangement of the resetting device, in which view different parts for the sake of clearness are represented drawn out from one another.
Figure 7 shows a longitudinal section according to Fig. 6.

The shaft 192 is provided with collars 293 (Figs. 6 and 7). On each pair of such collars runs a wheel 185 which is provided in its bore 294 with a cam 295. This lies in the ring groove 296 formed by each pair of collars.

Figures 8, 9:
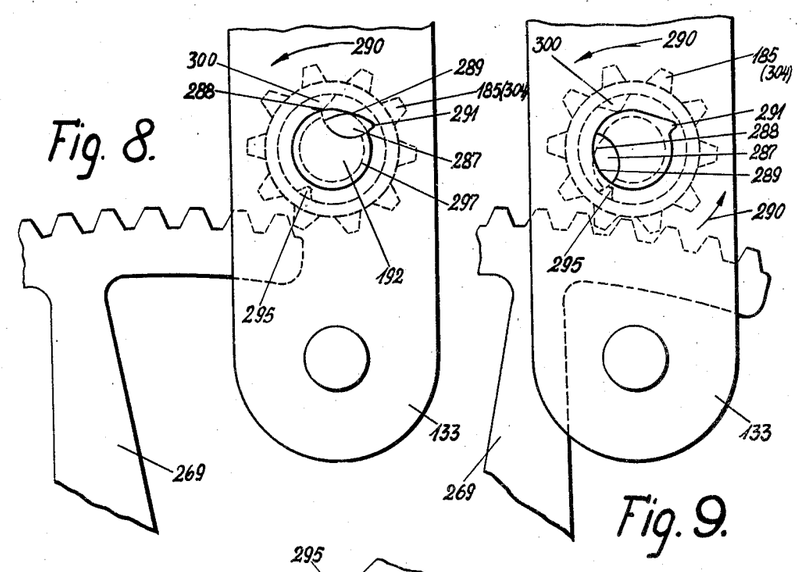
Figure 8 shows a side elevation of the resetting shaft in its home position.
Fig. 9 shows likewise a side elevation of the resetting device according to Fig. 6 in which view the resetting shaft is shown in an intermediate working position.

If the rotatable key 287 is located in the normal or home position illustrated in Figs. 6 and 8, the wheels 185 can freely rotate in each direction since the cams 295 lying in their bores 294 can freely rotate past the rotatable key 287.

On the right-hand side wall of the totalizer frame 133 the shaft 192 is mounted with its reduced journal 297 in the bearing 298 provided with a counter-sink 299 (Fig. 6), having a locking cam 300 (Figs. 6 to 10) which is adapted to co-act with the rotatable key 287 on rotation of the shaft 192 in the arrow direction 290. The right-hand end 297 of the shaft 192 projects through an elongated hole 301 of the right-hand side wall 302 of the totalizer casing.

On the journal 303 of the shaft 192 is fixed a toothed wheel 304 which is capable of being driven by the toothed segment 269 (Fig. 2) in the arrow direction 290 (Figs. 6 and 8 to 10) when the segment 269 is swung in the arrow direction 305.

The shaft 125 (Fig. 17) is provided with ring grooves 306 and 314 with which a pawl 307, see also Fig. 1, is capable of engaging, the pawl being pivoted at 308 on a bracket (not shown) arranged on the machine frame in any suitable manner. By means of a torsion spring (not illustrated) the forward end of the pawl 307 is pressed upwards against the shaft 125. The tail of the pawl 307 is adapted to co-act with a cam 309 arranged on the shaft 116.

Total taking

If, for example, a total is to be taken from the totalizer 16 (Fig. 1), first of all, the totalizer is brought into the working position and the total key 8 (Fig. 4) is depressed whereon the following operations occur.

By depressing the key 8 of the key lever 6 the coupling 241, 252 is closed, as described under the chapter "Coupling and driving mechanism for total taking."

On depression of the total key 8 the incline 277 (Figs. 1, 17 and 18) formed on the key lever 6 acts on the lever 278, whereby the latter is swung round the screw 310 in the clockwise direction. As a result, the ring groove sleeve 283 (Figs. 5 and 17) arranged on the shaft 125, the toothed wheel 124, the two cams 127, 128 and the shaft 125 itself are moved in the arrow direction 286 against the action of the spring 284, whereby the cam disc 128 moves out of the working position in relation to the nose 129 of the lever 130 and the cam 127 moves into the working position with the nose 129 of the lever 130. At this moment the forward arm of the pawl 307 springs into the ring groove 306 of the shaft 125 and holds the parts 283, 124, 127, 128 on the shaft, in the displaced position.

In the swinging of the lever 278 in the clockwise direction round the screw 310, the part 311 formed as shown in Fig. 18 is shifted to the left whereby the face 312 of the part 311 is positioned over the key lever 4, depressed through the lug 275 of the depressed total key lever 6. Consequently, on the release of the total key 8 prior to the completion of the total taking operation, the lever 4 is prevented from returning to its normal position.

As has been explained under the chapter "Operation of the drive for the adding and printing mechanism" on depression of the lever 4, the coupling 102 is closed and the shaft 12 commences to rotate in the arrow direction 22.

During the rotation of the coupling 102 and the shaft 12 in the arrow direction 22, the shaft 116 (Fig. 16) is driven in the direction of the arrow 115 by means of the parts 108 (Fig. 4) 112, 113, 114 in which rotation the toothed wheel 120, arranged on the shaft 116 also participates. Since the toothed wheel 120 (Fig. 1) is in engagement with the toothed wheel 124, the cams 127 and 128 are rotated in the direction of the arrow 126 to enable the raised part of the cam 127 (Fig. 5) to wipe against the nose 129 of the lever 130 and swing the same in the anti-clockwise direction round the shaft 180 against the action of the spring 181. The nose 131 of the lever 130 thereupon is pressed against the lug 132 of the totalizer frame 133, to rock the totalizer frame round the shaft 134 (Fig. 2) in the clockwise direction against the action of the spring 187 so that the toothed wheels 134a move into engagement with the teeth of the racks 135.

As described above under the chapter "Coupling and driving mechanism for total taking," the shaft 240 is coupled with the discs 253, 257 on the depression of the total taking key 8. On the before mentioned movement of the parts 108, 112, 113, 114, the shaft 240 and the parts 253, 257 coupled therewith are driven in the arrow direction 115 by the parts 112, 264, 263 (Fig. 4).

By this rotation of the disc 257 the connecting rod 265, jointed to it by means of the pin 266, is actuated and swings the lever 267 (Fig. 2) which is jointed to it and which is rigidly mounted on the shaft 268, in the clockwise direction. In the swinging movement of the lever 267 participates also the toothed segment 269 rigidly mounted on the shaft 268 and this toothed segment in one revolution of the disc 257 is swung once to and fro. At this point it may be mentioned that the disc 257 only makes one revolution. At the commencement of the actuation of the segment 269 the projection 270 arranged on the same acts on the nose 271 of the bail 272, 273 and swings the same in the anti-clockwise direction whereby the bridge 273 of the bail 272, 273 is rocked into contact with the downwardly projecting arms 198 of the levers 194, to lock the levers 194 so that the tens transfer levers 190 are held in the path of the tens transfer cams 189 (Fig. 6) of the toothed wheels 185. The tens transfer levers 190 are held in this position by the reciprocating cam running concentrically with the pivot of the segment 269.

Figure 10:
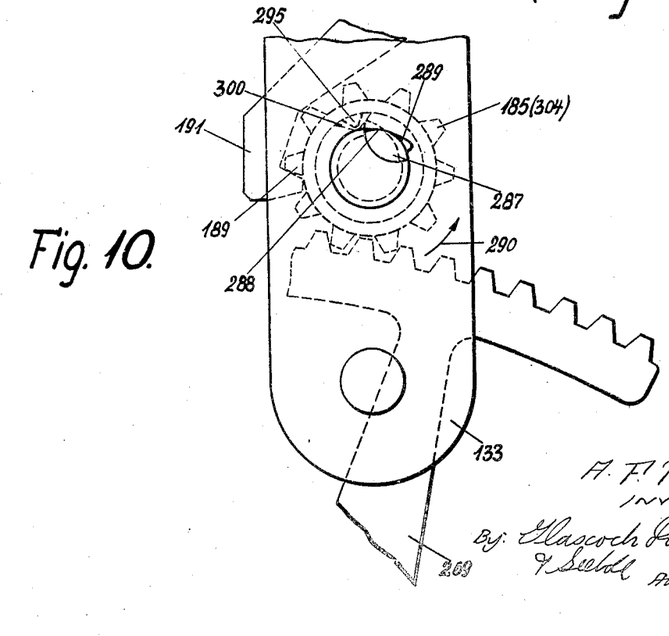
Figure 10 shows a further side elevation of the resetting device according to Fig. 6 in which view the resetting shaft is shown in the working position, at the time the resetting process is just brought to an end.

The segment 269 in its swinging movement in the arrow direction 305 drives the wheel 304 lying opposite to it in the arrow direction 290, whereby the shaft 192 is likewise rotated in the arrow direction 290 from the position according to Fig. 8 to the position according to Fig. 10, which movement is approximately through 340 degrees of the revolution. In this rotation the control cam 291 of the bearing 292 of the left hand side wall of the totalizer frame acts on the surface 289 of the rotatable key 287, to cause the key to rotate in the opposite direction to the arrow 290. Consequently, the edge 313 of the part 288 of the rotatable key 287 projects beyond the periphery of the shaft 192 and acts as driver for the cams 295 of the wheels 185, whereby these and the numeral wheels 183 in connection with them are carried back to zero. The zeroizing is finished as soon as the edge 313 of the rotatable key 287 strikes the cam 300 (Fig. 10) located in the counter-sink 299 of the right hand side wall of the totalizer frame.

Simultaneously in this zero position of the wheels 185, the tens transfer cams 189 (Figs. 6 and 10) of the wheels 185 strike against the noses 190 of the tens transfer levers 191, which levers 191 are brought to their working positions with regard to said transfer cams 189 and locked in the same in the manner above described. Thereby an overthrow of the reset wheels 185 and the number wheels 183 is prevented.

Since the shaft 192 does not make a complete revolution but is rotated only through 340 degrees, the shaft 192 does not come to its home position shown in Fig. 8. The lock 289, 291 may only be operated when the resetting parts are in the home position, while the lock 289, 291 is prevented from action by the coaction of the face 289 of the rotatable key 287 with the inner circumferential face of the bearing 292 of the totalizer casing 133, when the resetting process is finished, as shown in Fig. 10. Accordingly, in this position the resetting shaft 192 is released for the return movement in a direction opposite to the arrow 290.

At this moment, the segment 269 has finished its swinging movement in the arrow direction 305, whereby the connecting rod 265 is in its second dead center position.

As soon as the engagement of the totalizer has taken place, the toothed sectors 136 and 137 (Fig. 16) are acted upon in the arrow direction 140 by the levers 118 and 113. Since the member 138 is attached to the toothed sectors 136 and 137 this member also travels in the arrow direction 140, whereby the noses 139 of the actuator sectors 19 are released and consequently the actuator sectors 19 are unlocked. In this operation the toothed segments 141 and 142 which are in engagement with the toothed sectors 136 and 137 are swung round the shaft 64 in the clockwise direction in which swinging movement the beam 76 projecting into the recesses 143 and 144 of the toothed segments 141 and 142 also participates.

In the swinging movement of the beam 76 in the clockwise direction round the shaft 64 the beam remains inoperative on the adjusting and indicating wheels 57, since these wheels are in their normal or right hand positions illustrated in Fig. 17.

In the rotation of the wheels 185 (Fig. 6) in the arrow direction 290, the segments and type-printing rods 19 (Fig. 2) are displaced in the arrow direction 140 by way of the toothed wheels 134a corresponding to the amount registered in the totalizer. Over-shooting of the zeroized wheels 185 (Fig. 9) in the arrow direction 290 is prevented by the previously locked tens transfer levers 194.

The positioned types are impressed upon the paper carried by the platen 167 by means not pertinent to the present invention.

After one-half of a revolution of the main drive shaft 12 the coupling casing 102 and the mechanisms in connection with it have come to rest as above described under the chapter "Operation of the drive for the adding and printing mechanism."

As soon as the zeroizing of the wheels 185 of the totalizer located in the working position or the printing of the total has been effected, the nose 129 (Figs. 1 and 5) of the totalizer rocking lever 130 slides off from the raised part of the cam 127, whereby the lever 130 is swung in the clockwise direction under the action of the spring 181. In consequence of this the totalizer frame arranged in the totalizer casing can now swing round the shaft 134 in the anti-clockwise direction under the action of the spring 187, the swinging movement being limited by contact of an edge of the totalizer frame against the pin 188 arranged on the totalizer casing. In the swinging of the totalizer frame in the anti-clockwise direction round the shaft 134 the toothed wheels 134a are disengaged from the teeth of the racks 135, whereby the driving connection of the racks 135 with the totalizer located in the working position is interrupted.

As soon as the nose 129 of the totalizer rocking lever 130 has again moved from the raised part of the cam 127 on to the lower part of the same, the cam 309 acts on the pawl 307 and swings the same round the pin 308 in the clockwise direction against the action of the torsion spring (not illustrated) whereby the forwardly extending arm of the pawl 307 moves out of the ring groove 306 of the shaft 125 and accordingly the shaft 125 and the parts 283, 124, 127 and 128 (Fig. 5) arranged on it, are axially returned under the action of the spring 284 against the arrow direction 286.

Thereby the forwardly extending arm of the pawl 307 (Figs. 1, 5 and 17), enters the ring groove 314 of the shaft 125, whereby the shaft 125 and the parts 283, 124, 127, 128 fixed to the same are arrested in their return movement before said parts have come to their final home positions. In this position the nose 129 of the lever 130 is in contact with the arcuate surface 316 connecting the cams 127, 128 the radius of which part 316 corresponds to the lower part of the cams 127, 128.

In the swinging of the lever 278 in the anti-clockwise direction under the action of the spring 284, the face 312 of the offset 311 (Fig. 18) also releases the key lever 4, whereby the key lever 4 under the action of its spring 86 is rocked round the screw 85 in the anti-clockwise direction into its position illustrated in Fig. 12, so that the coupling casing 102 again participates in the further rotation of the shaft 12 as above described under the chapter "Operation of the drive of the adding and printing mechanism."

For the remainder, the operations hereinbefore described occur, for which reason these shall not be described further. Similarly the parts 158, 160, 161, 162, 147, 148, 149, 150, 152, 153, 154, 156 are returned to their rest positions in the manner above described, under the chapter "Operation of the printing mechanism."

In said further rotation of the coupling casing 102 in arrow direction 22 the toothed sectors 136 (Fig. 16) and 137 during the second half of the revolution of the levers 117 and 114 are moved by way of the levers 118 and 113 through the intermediary of the parts 108, 112 in the opposite direction of the arrow direction 140, whereby the toothed segments 141 and 142 standing in engagement with the toothed sectors 136 and 137 are acted upon round the shaft 64 in the anti-clockwise direction, whereby the beam 76 is likewise swung in the anti-clockwise direction into the normal position.

Besides the actuator sectors 19 are naturally also brought back into the rest position by the beam 138 fixed to the toothed sectors 136 and 137 in consequence of its action on the noses 139 of the actuator sectors 19.

During said second half revolution of the parts above described, the pawl 307 slides upon the raised part 315 of the cam 309. During this movement the totalizer rocking lever 130 is held in working position with regard to the part 316 of the cams 127, 128 by the co-action of the pawl 307 with the ring-groove 314 in the manner above described. Since the radius of the part 316 corresponds to the lower part of the cam 127, 128, the lever 130 may not be operated by the part 316 during this second half revolution of the machine parts including the shaft 125. Accordingly the wheels 134 of the totalizer do not come in engagement with the toothed sectors 135 of the printing sectors 19. Consequently it is not possible to bring the value which was cancelled from the totalizer again into the same by the above-mentioned return movement of the printing sectors 19, which is effected during the second half revolution of the machine part.

Shortly before the completion of the second half revolution of the machine parts including the shaft 116 and the cam 309 fixed upon the shaft 116, the cam 309 acts with its raised part 317 upon the pawl 307 and rocks the same against the action of its torsion spring further in the clockwise direction. Thereby the pawl 307 disengages from the ring groove 314 of the shaft 125. Consequently, the shaft 125 and the parts 283, 124, 127 and 128 fixed thereon are moved back under the action of the spring 284 in the arrow direction 286 to the home position (Fig. 17). In this position the lever 130 is again in working position with regard to the adding cam 128.

As described under the chapter "Coupling and driving mechanism for total taking," the coupling of the shaft 240 with the cams 253, 257 for one revolution is effected, whereby on the revolution of the disc 257 the parts 265, 267, 268, 269 are also operated. Thereby the toothed segment 269 is moved back in the opposite direction of the arrow 305 during the second half revolution of the disc 257, whereby the same operates the toothed wheel 304 and therewith the resetting shaft 192. Thereby the wheel 304 and the resetting shaft 192 are reversely rotated from the resetting position shown in Fig. 10 to the home position shown in Fig. 8. This is possible, since the lock 289, 291 may not be effective in the resetting position as described heretofore. The gearing parts of the totalizer including the number wheels 183, which are reset to zero position by the resetting shaft 192 do not take part in the return movement of the shaft 192, since the friction of their bearings and the interengagement of the teeth of the denominational trains of wheels are greater than the frictional engagement of the gears 185 with the shaft 192. At the end of the return movement of the shaft 192 in the opposite direction of the arrow 290 the face 288 of the rotatable key 287 wipes under the cam 300 (Fig. 8), which operates to turn the key 287 in its seat, to its normal position, so that the lock 289, 291 is again effected. In this home position the resetting shaft 192 cannot be rotated in the opposite direction of the arrow 290. At the end of said return movement of the parts 253, 257, 265, 268, 269, that is, after one revolution of the discs 253, 257 the coupling 252, 241 (Fig. 4) is again released as described under the chapter "Coupling and driving mechanism for total taking."

In the home position of the segment 269, the bridge 271, 273 is again released from the part 274 of the segment 269, whereby the lever 194 described above for holding the tens transfer lever 190 is again released.

Shortly before the completion of a revolution of the coupling casing 102 (Fig. 12) the nose 93 of the coupling pawl 94 acts on the nose 101 of the part 98 which, after the release of the addition key 84, was moved with its nose 101 into the path of movement of the nose 93 of the coupling pawl 94. In consequence of this, the coupling pawl 94 is swung round the pin 105 in the clockwise direction against the action of the spring 103 so that the nose 106 of the coupling pawl 94 moves out of engagement with the cam 107, so that the coupling casing no longer participates in the revolution of the main drive shaft 12 and the mechanisms are held in their rest positions.

I claim:

1. In a totalizer normalizing device, a frame having journal bearing openings, a longitudinally grooved shaft rotatably mounted therein, a series of wheels rotatably mounted directly on the shaft, a normalizing key oscillatable in the groove to effective or ineffective position with respect to said wheels, angularly offset faces on said key, said frame defining an indentation at one of the bearing openings for receiving one of said offset faces when the key and shaft are in their ineffective positions and coacting with said face to rotate the key into effective position upon rotation of the shaft in one direction, means to rotate the shaft while the key is in its effective position, to restore the wheels to normal, and means at the other bearing opening coacting with the other of said offset faces to restore the key to its ineffective position during rotation of the shaft in the opposite direction.

2. In a totalizer normalizing device, a frame including two end members provided with openings, a shaft rotatably mounted in said end members having a series of spaced annular grooves and a longitudinal groove, a plurality of wheels rotatably mounted on the shaft and having lugs entering the annular grooves, a key angularly movable in said groove and having an edge engageable with the lugs, means to rotate the shaft while the key is in its effective position, to restore the wheels to normal position, angularly offset cams, one at each end of the key, arranged in the said openings, a cam face in one of said openings to cooperate with one of the offset cams to rotate the key in an opposite direction to the direction of rotation of the shaft at the beginning of shaft rotation, and a lug in the other of said openings to cooperate with the other of the offset cams on the key to rotate the key in an opposite direction to the rotation of the shaft near the end of the rotation of the shaft in a direction opposite to that in which the shaft was first rotated.

AUGUST FRIEDRICH POTT.